(12) United States Patent
Brogyanyi et al.

(10) Patent No.: US 6,616,810 B1
(45) Date of Patent: Sep. 9, 2003

(54) DEVICE FOR REMOVING WATER FROM A FIBROUS MATERIAL STRIP

(75) Inventors: Edgar Brogyanyi, Graz (AT); Karl Hornhofer, St. Radegund (AT); Wilhelm Mausser, Graz (AT); Franz Petschauer, Lannach (AT); Johann Sbaschnigg, Graz (AT)

(73) Assignee: Andritz AG, Graz (AT)

( * ) Notice: Subject to any disclaimer, the term of this patent is extended or adjusted under 35 U.S.C. 154(b) by 0 days.

(21) Appl. No.: 09/889,262
(22) PCT Filed: Nov. 9, 2000
(86) PCT No.: PCT/EP00/11072
§ 371 (c)(1), (2), (4) Date: Sep. 28, 2001
(87) PCT Pub. No.: WO01/36746
PCT Pub. Date: May 25, 2001

(30) Foreign Application Priority Data

Nov. 17, 1999 (AT) .............................................. 1942/99

(51) Int. Cl.$^7$ .................................................. D21F 1/00
(52) U.S. Cl. .................... 162/301; 162/358.3; 162/372; 162/373
(58) Field of Search ................................ 162/300, 301, 162/358.1, 360.2, 358.3, 357, 372, 373, 368; 210/400, 401

(56) References Cited

U.S. PATENT DOCUMENTS

| 2,881,676 | A | * | 4/1959 | Thomas ........................ 162/301 |
| 3,796,149 | A | * | 3/1974 | Heissenberger ........... 162/360.2 |
| 4,483,745 | A | * | 11/1984 | Wicks et al. .............. 162/360.2 |
| 4,888,096 | A | * | 12/1989 | Cowan et al. ............ 162/358.1 |
| 5,389,205 | A | * | 2/1995 | Pajula et al. .............. 162/360.2 |
| 5,820,731 | A | * | 10/1998 | Soderholm ................... 162/210 |
| 6,197,160 | B1 | * | 3/2001 | Sbaschnigg et al. ......... 162/300 |
| 6,338,773 | B1 | * | 1/2002 | Sbaschnigg et al. ......... 162/301 |

FOREIGN PATENT DOCUMENTS

| WO | 98/32917 | * | 7/1998 | .............. 162/360.2 |
| WO | 99/66122 | * | 12/1999 | |
| WO | 00/31336 | * | 6/2000 | .............. 162/358.1 |

* cited by examiner

Primary Examiner—Peter Chin
(74) Attorney, Agent, or Firm—Alix, Yale & Ristas, LLP

(57) ABSTRACT

A device for dewatering a pulp web having a dewatering section comprising top and bottom wires forming a wedge-shaped dewatering zone which can be adjusted and/or pressure-loaded at the downstream end, and with a pair of press rolls mounted at the end of the bottom wire. The top roll of the pair of press rolls is a shoe press roll.

11 Claims, 6 Drawing Sheets

DEVICE FOR REMOVING WATER FROM A FIBROUS MATERIAL STRIP

CROSS-REFERENCE TO RELATED APPLICATIONS

This is the national stage of International Application No. PCT/EP00/11072 filed Nov. 9, 2000.

BACKGROUND OF THE INVENTION

The invention relates to a device for dewatering a pulp web, with a dewatering section comprising a top and a bottom wire where there is a first wedge-shaped dewatering zone which can be adjusted and/or pressure-loaded at the end, and with a pair of press rolls mounted at the end of the bottom wire.

A device of this kind is known from AT 405538B, for example. Here a device is already described with a wedge-shaped dewatering zone and which is adjustable at the end. In this case a pulp suspension is fed in with a consistency of, for example, approximately 1–1.5% and the pulp web has a dry content in the range of approximately 12–14% DS (dry solids) at the end of the wedge. Further measures, particularly the use of a heavy duty press after the dewatering press, are applied in attempts to obtain the highest possible dry content in the pulp web. This is particularly important for the subsequent thermal drying stage, which requires less energy input with higher dry content levels at the inlet. The demands made on the dewatering units rise constantly in terms of throughput and dewatering performance, not least in order to minimize the specific costs.

SUMMARY OF THE INVENTION

The aim of the invention is to create a device that can be used for all different kinds of products and achieve the highest possible dry content levels.

The invention is thus characterized by a shoe press roll being used as the top roll of the press roll pair at the end of the bottom wire. By using a shoe press roll it is possible to apply higher pressing forces at this point and for a longer period, which results in a corresponding increase in dry content.

An advantageous further development of the invention is characterized by a felt running over the shoe press roll. With this arrangement even more water can be removed from the press zone.

A favorable further development of the invention is characterized by the bottom roll having an outer shell with holes and inner roll shell with grooves in longitudinal direction. With this configuration the water drains particularly well out of the press zone, thus permitting a substantially better dewatering effect by pressing.

An advantageous configuration of the invention is characterized by suction boxes being mounted on the face ends of the bottom press roll. This permits even faster and better drainage of liquid from the press zone.

A favorable configuration of the invention is characterized by the bottom press roll in the press roll pair at the end of the bottom wire being built with deflection compensation elements along the length of the roll. As a result it is possible to apply higher line pressures (up to 1500 N/m working width) with the shoe press roll, particularly with larger working widths, thus achieving a higher dry content than with a conventional roll press.

A favorable further development of the invention is characterized by at least one further pair of press rolls being provided after the wedge-shaped dewatering zone. A higher dry content, which is beneficial to further dewatering, can be achieved by placing one, two or, for example, three additional pairs of press rolls after the wedge zone.

A favorable configuration of the invention is characterized by the press rolls being designed with a smooth surface, however they may also have a grooved surface as an alternative.

A favorable further development of the invention is characterized by a web heating device, for example a steam blow box, being provided ahead of the shoe press roll. By including a web heating device the viscosity of the water contained in the web is reduced, thus facilitating dewatering by pressing in the subsequent shoe press, which leads in turn to higher dry content levels.

An advantageous configuration of the invention is characterized by supported web transfer after the shoe press roll by a suction roll to a second shoe press, where one felt can be run round the shoe press roll and one round the deflection compensation roll in the second shoe press.

A favorable configuration of the invention is characterized by the entire device being suitable for cantilevering. Since the machine can be fully cantilevered, wires and felts can be changed easily.

BRIEF DESCRIPTION OF THE DRAWINGS

In the following the invention is described in examples based on the drawings, in which.

DETAILED DESCRIPTION OF THE PREFERRED EMBODIMENT

Figure 1:
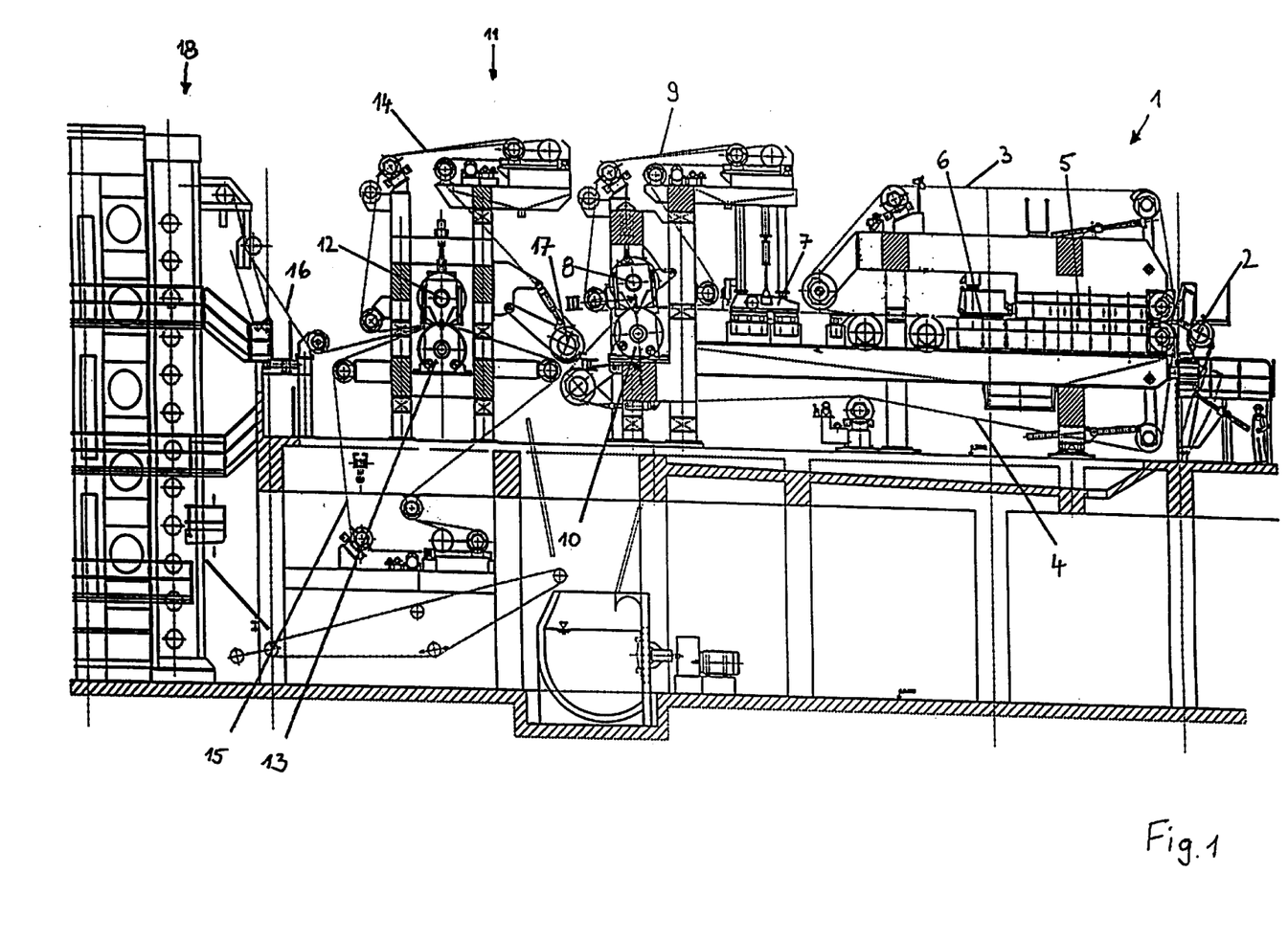
FIG. 1 is a schematic view of a first embodiment of the invention.

The pulp suspension, for example, chemical pulp, TMP or secondary fibre suspension, is fed to a first dewatering section 1 through a head box 2 and in between a top wire 3 and a bottom wire 4.

The head box 2 can be fitted optionally with or without a basis weight cross-profile correction device. In the first dewatering zone the top wire 3 and the bottom wire 4 converge in a wedge shape at 5. At the end of this zone there is an adjustable sector 6 which can be pressure loaded. Since the outlet gap can be adjusted and pressure loaded, production and thus, web thickness can be adapted to the given requirements, permitting web speeds of up to 350 m/min. The pulp web rests subsequently on the bottom wire only and is brought to a heating section, consisting either of hot water charge or a steam blow box 7 above the pulp web and a suction box belonging to it under the wire beneath the blow box. Since the web heats up, the viscosity of the water contained in the pulp web is reduced, which benefits dewatering in the subsequent press. At the end of the bottom wire 4 there is a shoe press roll 8 with a felt 9 running over it. With the shoe press there is a broader supporting surface for transmission of force for dewatering. As a result, much higher line pressures, e.g. 1500 N/mm working width can be applied than with conventional press rolls (350 N/mm working width maximum). Since the felt runs along with the web, the water pressed out is absorbed by the web and can thus be carried away from the pulp web more effectively. The mating roll in the bottom wire 4 is a special dewatering roll 10, which is equipped with deflection compensation elements over the roll length and at which water drains off through a perforated stainless steel shell into a roll shell which has longitudinal grooves for this purpose. To improve dewatering, suction boxes (not shown here) are mounted. on the face ends of this dewatering roll 10. This is followed by a shoe press unit 11 made up of a shoe roll 12 and a deflection compensation roll 13. Here, too, there is a top felt 14 and a bottom felt 15 that run over the appropriate rolls. Thus the water pressed out of the web here can be drained off very effectively. The pulp web 16 is transferred from the bottom wire 4 by supported web transfer, i.e. without open draw, by means of the suction roll 17 to the next shoe press unit 11. According to the state of the art, a dry content of approximately 16% was achieved after the first wedge zone at a suspension concentration of approximately 1.5%. A dry content of approximately 30% could be achieved at the end of the bottom wire after a conventional press. By applying conventional presses (combi-presses) after the dewatering press and finishing with a heavy-duty press, dry content levels were obtained between 45 and 48%, depending on the product. These data apply to production of 2500 tonnes/day and a working width of 8.2 m. When a shoe press roll is used and a suitable mating roll at the end of the bottom wire in the first dewatering section according to the invention, a dry content of approximately 40% can already be obtained at this point, thus the conventional pressing devices required hitherto can be dispensed with and dry content levels of approximately 50% obtained after the second press.

Figure 2:
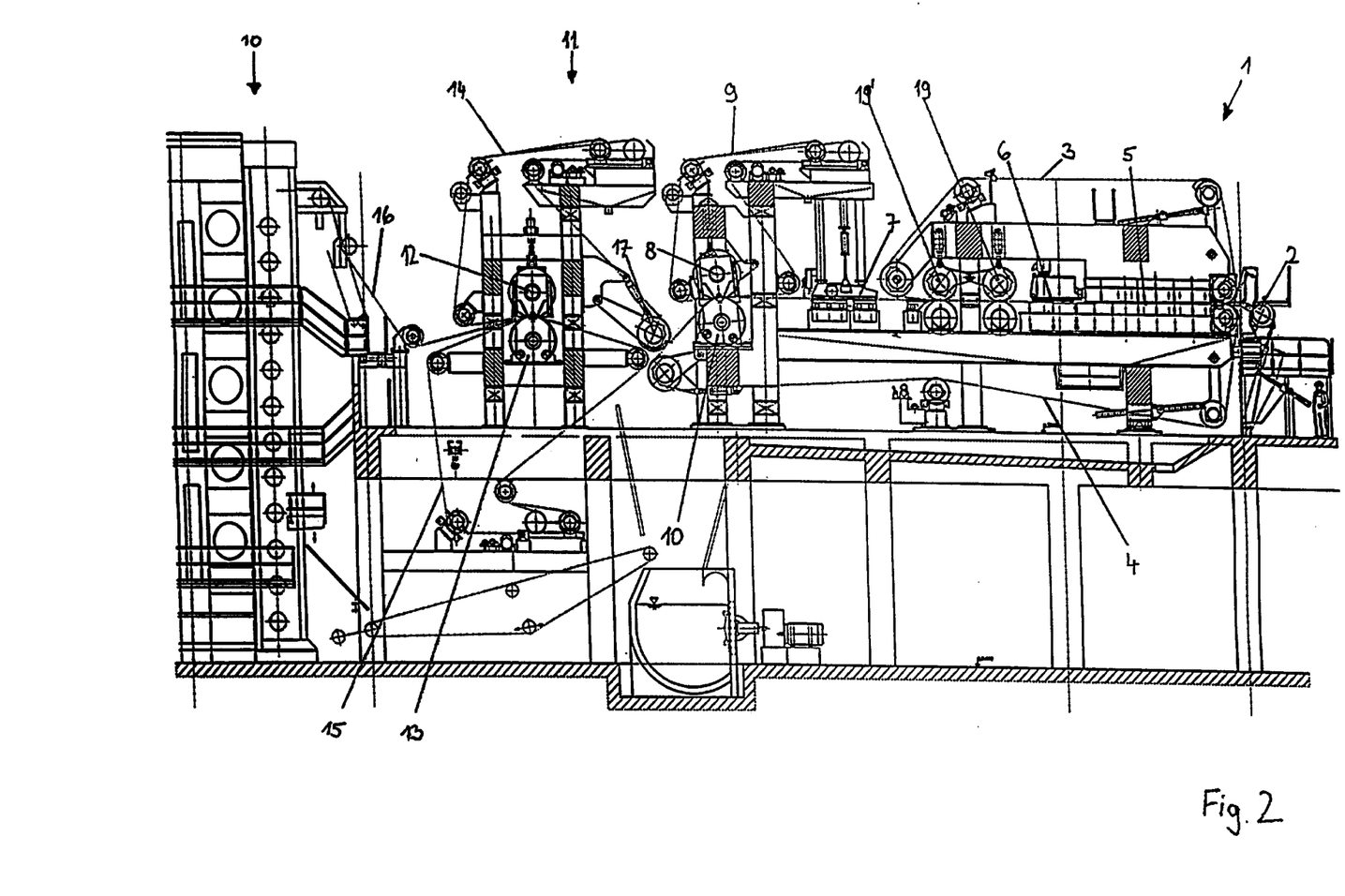
FIG. 2 is a schematic view of a second embodiment of the invention.

A further increase in the final dry content is possible with the device according to FIG. 2. In this configuration pairs of press rolls 19, 19' are provided at the adjustable end 6 of the wedge zone to obtain better dewatering performance. These press rolls can be designed with a smooth or with a grooved surface, depending on production. Each pair of press rolls can yield an increase in dry content of approximately 4%, so that a dry content of approximately 44% can be achieved after the shoe press roll combination according to the invention at the end of the bottom wire. This in turn leads to dry content levels of some 53 to 55% after the additional shoe press unit 11. The web 16 is fed into the dryer 18 at this dry content. Thanks to this higher dry content before entering the dryer 18, substantial energy savings are possible. Furthermore, a corresponding increase in production can be achieved with existing dryers.

Figure 3:
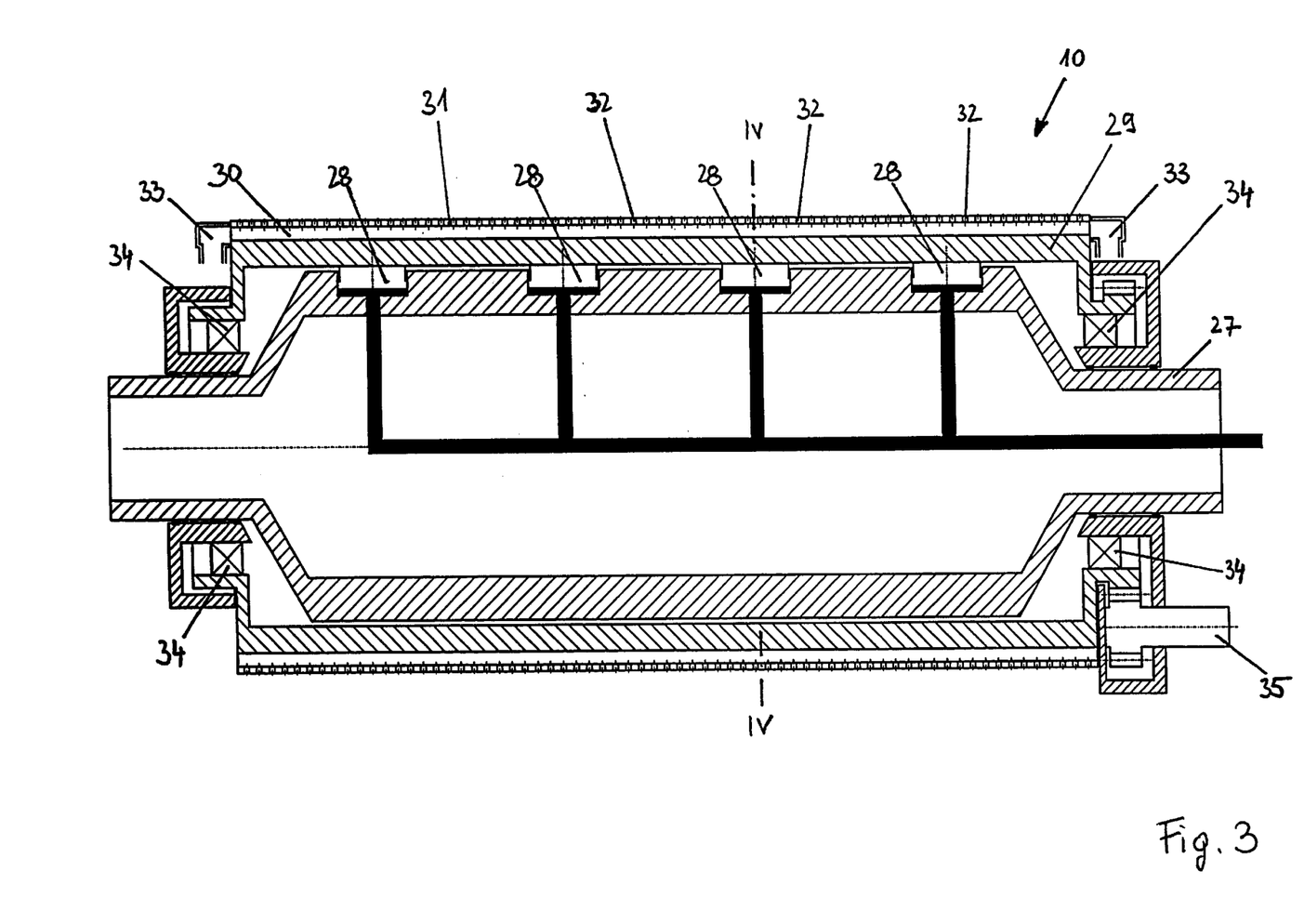
FIG. 3 is an enlarged sectional view taken along line III—III in FIG. 1.

FIG. 3 shows the bottom roll 10 at the end of the bottom wire 4. This illustration shows the fixed yoke 27, in which hydraulic supporting elements 28 are distributed over the roll length. Pressure is applied to these supporting elements with hydraulic oil, and the elements can also be controlled individually if necessary. Thus, deflection caused to the bottom roll 10 by the force applied to it can be compensated. A rotating roll shell 29 with longitudinal grooves 30 is mounted over the hydraulic supporting elements 28. In order to obtain even speed distribution in the longitudinal grooves, their cross-section may also broaden from the center towards the edge. This roll shell 29 is encased in a roll shell 31 made of, for example, stainless steel, with perforations 32. There are suction channels 33 on the face ends of the roll 10 through which the water is sucked out of the channels 30. The rotating roll shell 29 runs in bearings 34 on the fixed yoke 27 and is driven by a shaft 35 with a gearwheel.

Figure 4:
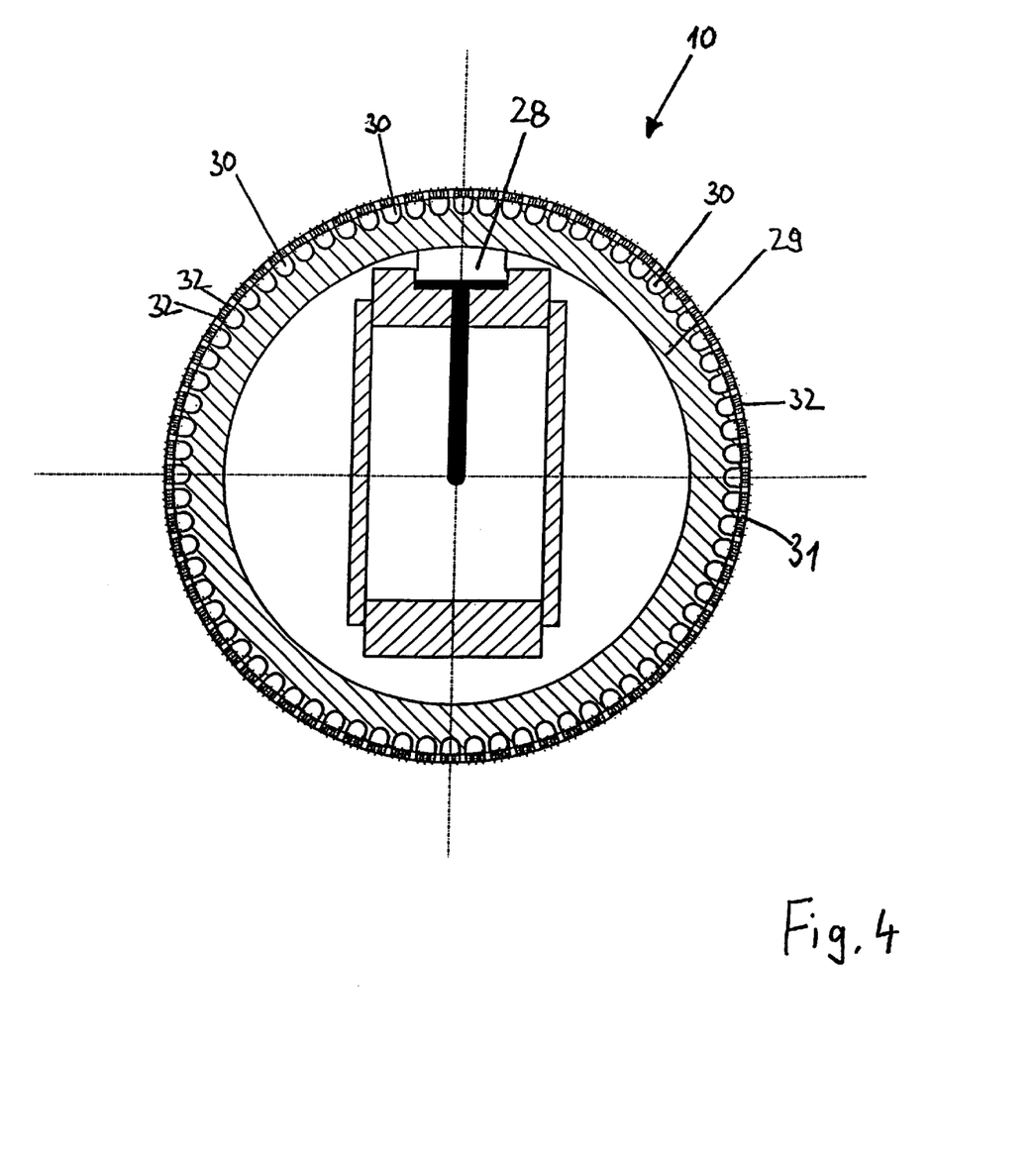
FIG. 4 is a sectional view taken along line IV—IV in FIG. 3.

FIG. 4 shows a sectional view at the line marked IV—IV in FIG. 3. This illustration clearly shows the individual longitudinal grooves 30 in the rotating roll shell 29. In addition, the figure shows that several perforations 32 in the outer roll shell lead into one longitudinal groove 30.

Figure 5:
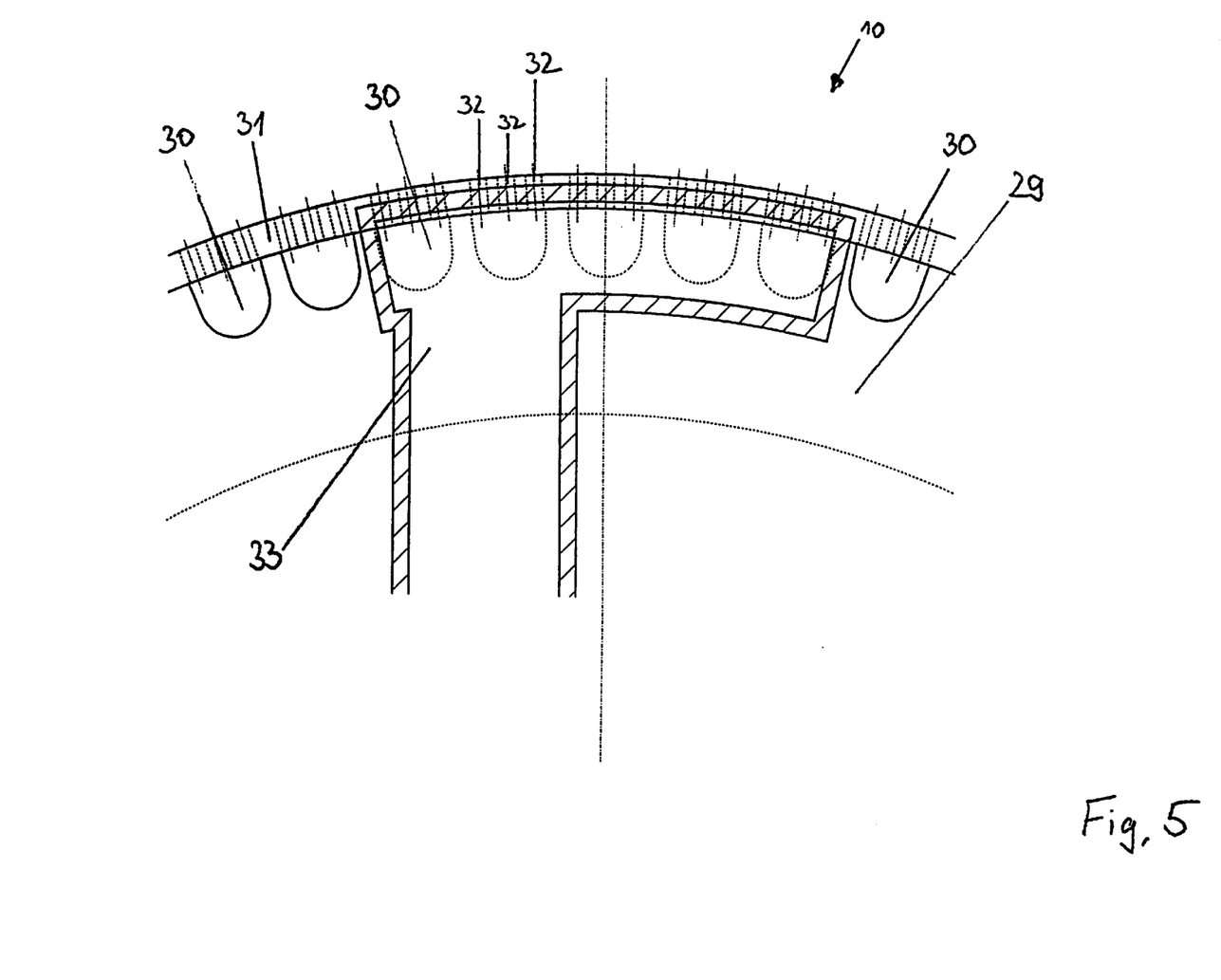
FIG. 5 is a detail from FIG. 3.

FIG. 5 shows a section of a side view in FIG. 3. This illustration again shows the rotating roll 29 with the individual longitudinal grooves 30, as well as the outer roll shell 31 with the holes 32. In addition, FIG. 5 shows a suction channel 33 on the face end of the roll 10. This channel 33 extends largely over all ends of the longitudinal grooves 30 at the press shoe of the shoe roll 8 mounted above the bottom roll 10. Thus, the suction channel 33 covers the area in which the main dewatering process takes place. By applying a vacuum, a substantial improvement is obtained in extraction by suction of the water from the pulp web and through the wire, then along the longitudinal grooves 30 and finally through the perforations 32, where the longitudinal grooves 30 can have a cross-section which broadens towards the edge in order to obtain even speed over the longitudinal grooves 30. In order to adapt better to the press shoe of the mating roll, the suction channel 33 can also be adjustable in size and location.

Figure 6:
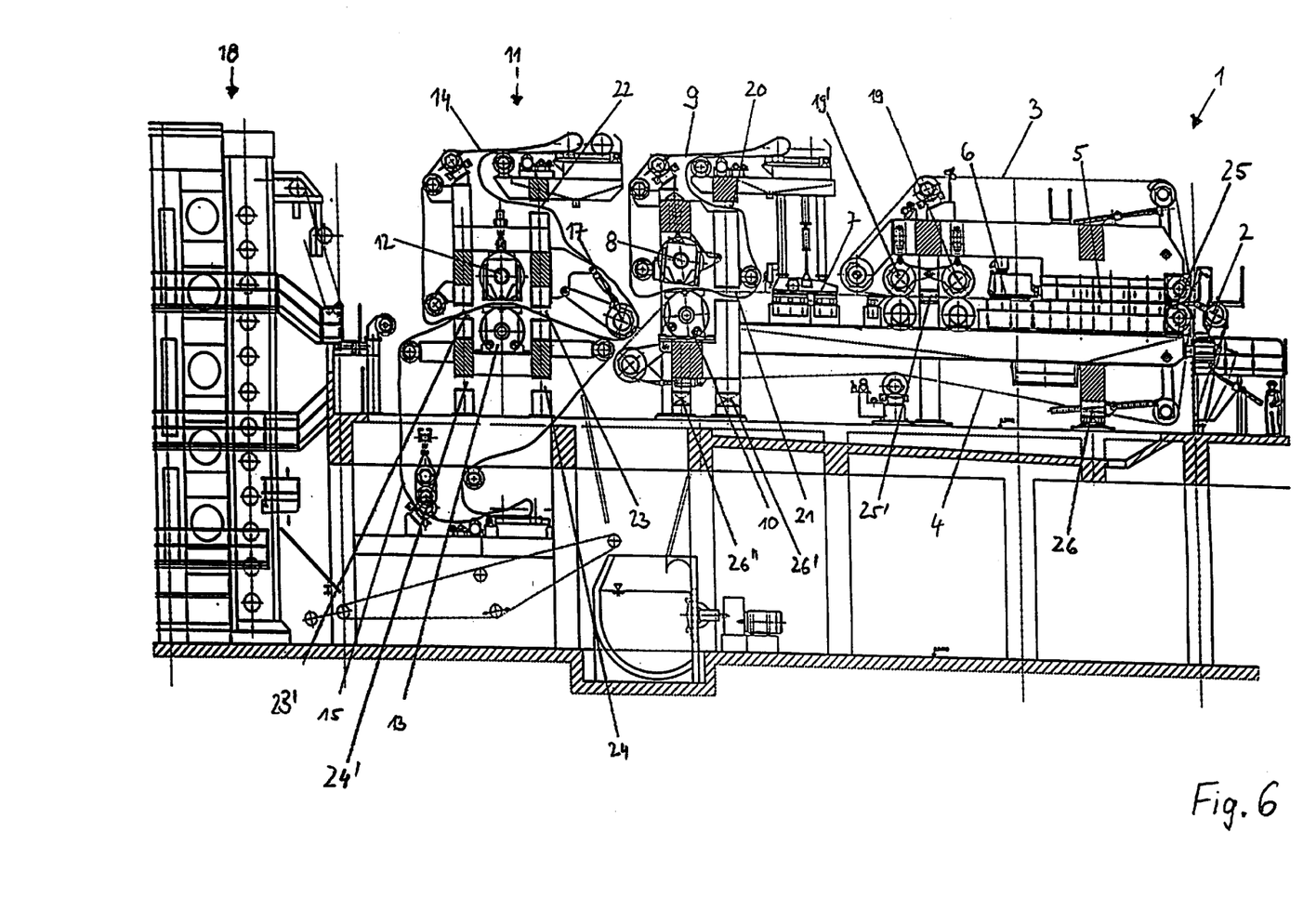
FIG. 6 illustrates the cantilevering facility of FIG. 2.

FIG. 6 now shows a plant according to FIG. 2, illustrating cantilevering of the felts running round the shoe press rolls. As shown in the illustration, the felt 9 in the form of an endless woven belt and which is guided round the top shoe press roll 8 at the end of the bottom wire 4 can be removed from the machine without any difficulty at the side by removing the spacers 20, 21 and raising the shoe press roll 8, thus it can be changed easily. The same applies to the top felt 14 of the second shoe press roll unit 11. Here the old felt can be removed and a new one threaded in easily from the side by removing the spacers 22, 23, 23' and raising the top shoe press roll 12. At the same time, the bottom felt 15 can be changed. Due to this design with cantilevering facility the felts can be changed quickly and easily. Similarly, the top wire 3 in the first dewatering section 1 can be changed by removing the intermediate pieces 25, 25' and the bottom wire 4 by removing the intermediate pieces 26, 26' and 26". In this way the machine can be fully cantilevered.

What is claimed is:

1. Device for dewatering a pulp web with a dewatering section comprising a top wire and a bottom wire defining longitudinally spaced upstream and downstream ends and a wedge-shaped dewatering zone, a first pair of press rolls mounted at the downstream end of the bottom wire, and means for adjusting the wedge shape of the dewatering zone at the downstream end, the first pair of press rolls defining a first shoe press unit including first top and bottom press rolls, the first top press roll being a first shoe press roll and the first bottom press roll including oppositely disposed face ends, an outer shell defining a plurality of holes, and an inner roll shell defining a plurality of longitudinally extending grooves.

2. Device according to claim 1, further comprising a first felt carried on the first shoe press roll.

3. Device according to claim 1, further comprising at least a second pair of press rolls disposed downstream of the wedge-shaped dewatering zone and upstream of the first pair of press rolls.

4. Device according to claim 3, wherein each of the press rolls of the second pair of press rolls has a smooth surface.

5. Device according to claim 3, wherein each of the press rolls of the second pair of press rolls has a grooved surface.

6. Device according to claim 1, further comprising a web heating device disposed upstream of the first shoe press roll.

7. Device according to claim 1, further comprising a suction roll and a second shoe press unit disposed downstream of the first shoe press unit, wherein the suction roll supportedly transfers the pulp web from the bottom wire to the second shoe press unit.

8. Device according to claim 7, further comprising second and third felts, the second shoe press unit including a second shoe press roll and a deflection compensation roll, the second felt being carried on the second shoe press roll and the third felt being carried on the deflection compensation roll.

9. Device according to claim 1, wherein the entire device is cantileverable.

10. Device according to claim 1, wherein the wedge-shaped dewatering zone is pressure-loaded at the downstream end.

11. Device for dewatering a pulp web with a dewatering section comprising a top wire and a bottom wire defining longitudinally spaced upstream and downstream ends and a wedge-shaped dewatering zone, a first pair of press rolls mounted at the downstream end of the bottom wire, and means for pressure loading the dewatering zone at the downstream end, the first pair of press rolls defining a first shoe press unit including first top and bottom press rolls, the first top press roll being a first shoe press roll and the first bottom press roll including oppositely disposed face ends, an outer shell defining a plurality of holes, and an inner roll shell defining a plurality of longitudinally extending grooves.

* * * * *

UNITED STATES PATENT AND TRADEMARK OFFICE
CERTIFICATE OF CORRECTION

PATENT NO. : 6,616,810 B1
DATED : September 9, 2003
INVENTOR(S) : Brogyanyi et al.

It is certified that error appears in the above-identified patent and that said Letters Patent is hereby corrected as shown below:

Column 4,
Line 53, after "ends" insert -- defining a length --.
Line 53, after "holes," delete "and".
Line 55, after "grooves" insert --, and a plurality of deflection compensation elements disposed along the length of the roll, the first pair of press rolls also including a plurality of suction boxes mounted on the face ends of the first bottom press roll --.

Column 6,
Line 10, after "ends" insert -- defining a length --.
Line 11, after "holes," delete "and".
Line 13, after "grooves" insert --, and a plurality of deflection compensation elements disposed along the length of the roll, the first pair of press rolls also including a plurality of suction boxes mounted on the face ends of the first bottom press roll --.

Signed and Sealed this

Twenty-eighth Day of December, 2004

JON W. DUDAS
*Director of the United States Patent and Trademark Office*